United States Patent [19]

Gesenhues

[11] Patent Number: 5,191,283
[45] Date of Patent: Mar. 2, 1993

[54] METHOD OF MEASURING RELATIVE SPEED AND REGULATING THE IN AND OUT STROKES IN A MOTOR-VEHICLE DASHPOT

[75] Inventor: Ludger Gesenhues, Witten, Fed. Rep. of Germany

[73] Assignee: August Bilstein GmbH & Co. KG, Ennepetal, Fed. Rep. of Germany

[21] Appl. No.: 754,925

[22] Filed: Sep. 4, 1991

[30] Foreign Application Priority Data

Nov. 17, 1990 [DE] Fed. Rep. of Germany ....... 4036703

[51] Int. Cl.[5] .......................... G01P 3/48; G01P 3/54; F16F 9/49; F16F 9/50
[52] U.S. Cl. ............................... 324/174; 324/207.15; 324/207.24; 324/226; 188/280
[58] Field of Search ...................... 324/207.11, 207.13, 324/207.15, 207.22, 207.24, 226, 262, 160, 173, 174; 188/279, 280

[56] References Cited

U.S. PATENT DOCUMENTS 4,883,150  11/1989  Arai ................................. 324/207.24

*Primary Examiner*—Walter E. Snow
*Attorney, Agent, or Firm*—Max Fogiel

[57] ABSTRACT

The invention concerns a method whereby not only the relative speed of the body and axle but also a dashpot's farthest-in and farthest-out positions can be measured without using complicated and expensive sensors. Relative speed is detected with a known combination of sensor coil and permanent magnet. The induced voltage at the midsection of the coil is proportional to relative speed. The voltage induced as the end of the coil is traveled by is exploited as a signal representing the dashpot's farthest-in and farthest-out positions.

8 Claims, 2 Drawing Sheets

METHOD OF MEASURING RELATIVE SPEED AND REGULATING THE IN AND OUT STROKES IN A MOTOR-VEHICLE DASHPOT

BACKGROUND OF THE INVENTION

The invention concerns a method of measuring relative speed and in and out strokes in a motor-vehicle dashpot.

Dashpots are employed as links in the transmission of vibrations from the road surface to the body through the wheel suspension. The mechanisms are usually hydraulic, which ensures both comfort and safety.

German OS 3 11 909 190 discloses a sensor for a dashpot associated with semi-actively controlled wheels in a motor vehicle. The sensor detects relative speed, the difference between the speed of the body and that of the axle. It consists of a long coil connected directly or indirectly to the dashpot's piston rod and of a permanent magnet on the cylinder. The magnet induces a voltage in the coil.

This sensor can deliver only one signal, which represents the difference in speeds. It cannot be employed to detect and hence adjust how far the piston travels in and out.

SUMMARY OF THE INVENTION

The object of the invention is a dashpot that can without complicated and expensive sensors detect and hence adjust not only the difference between the speed of the body and that of the axle but also the farthest-in and farthest-out positions of the piston. One result is a safer and more comfortable ride. Another is that the dashpot will be prevented from overstroking and will accordingly last longer.

This object is attained in accordance with the invention by a method of detecting the difference between the speeds and of establishing the farthest-in and farthest-out positions of a piston secured to a piston rod and traveling back and forth in the cylinder of a motor-vehicle dashpot. This method is employed in a device that is state of the art.

It has been discovered that voltage induced at the middle of a sensor coil is proportional to the difference in speed. At the end of the coil, however, the induced voltage is known to increase. This characteristic has never been utilized to generate a signal, and one of skill in the art intentionally neglects it as a factor of length. In accordance with the invention on the other hand, the higher induced voltage at the end of the coil is actually exploited as a signal for the farthest-in and farthest-out positions of the piston. In one embodiment of the invention, the signal is compared with a voltage threshold above the level of induced voltage at the middle of the coil.

The inductivity of the sensor coil can also be increased to even more precisely evaluate the farthest-in and farthest-out points of the stroke.

BRIEF DESCRIPTION OF THE DRAWINGS

The invention will now be specified with reference to the accompanying drawing, wherein.

Figure 1:
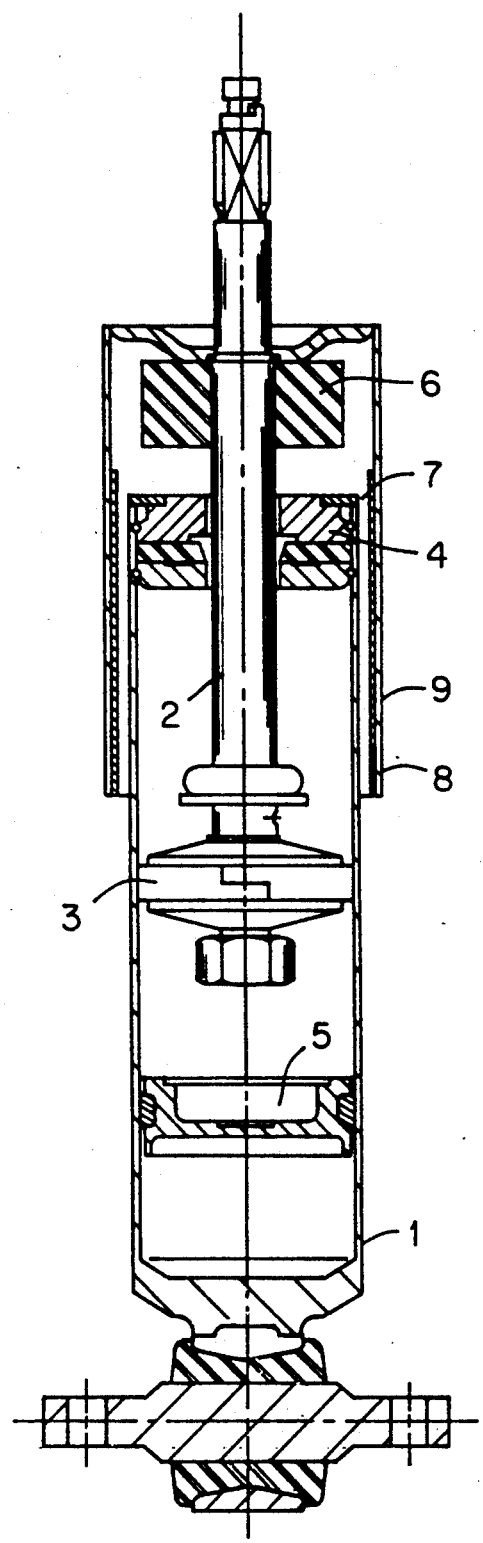
FIG. 1 illustrates a dashpot with a sensor coil in its housing and a permanent magnet secured to its cylinder.

The variable hydraulic dashpot illustrated in FIG. 1 consists essentially of a cylinder 1 sealed off at one end by a centering cap 4 and of a housing 9. The housing is made of non-magnetic material and fastened to a piston rod 2. Cylinder 1 is separated into two hydraulics chambers by a partitioning piston 5. Below partitioning piston 5 is a gas-filled chamber that compensates for the increase and decrease in the volume of the hydraulics chambers dictated by the in-and-out motion of piston rod 2. Above partitioning piston 5 is a shock-absorbing piston 3. This piston is secured to moving piston rod 2. The rod extends through a seal in centering cap 4. Non-magnetic housing 9 is open at one end and fits over cylinder 1. Embedded in the housing is a sensor coil 8. A permanent magnet 7 is mounted on cap 4 and accordingly travels back and forth through the coil. There is an air gap between the magnet and the coil.

When an irregularity in the road forces cylinder 1 up, magnet 7 will rise inside sensor coil 8 and induce in it a voltage $U_{ind}$. This voltage is plotted as a function of coil length $l_{sp}$. Along the midsection of the coil this voltage is proportional to relative speed $V_{rel}$. At the ends, however, it increases considerably and can accordingly be exploited to detect the piston's farthest-in and farthest-out positions. For this purpose, sensor coil 8 does not wind along the total length of housing 9, but only on a level with those positions.

Figure 2:
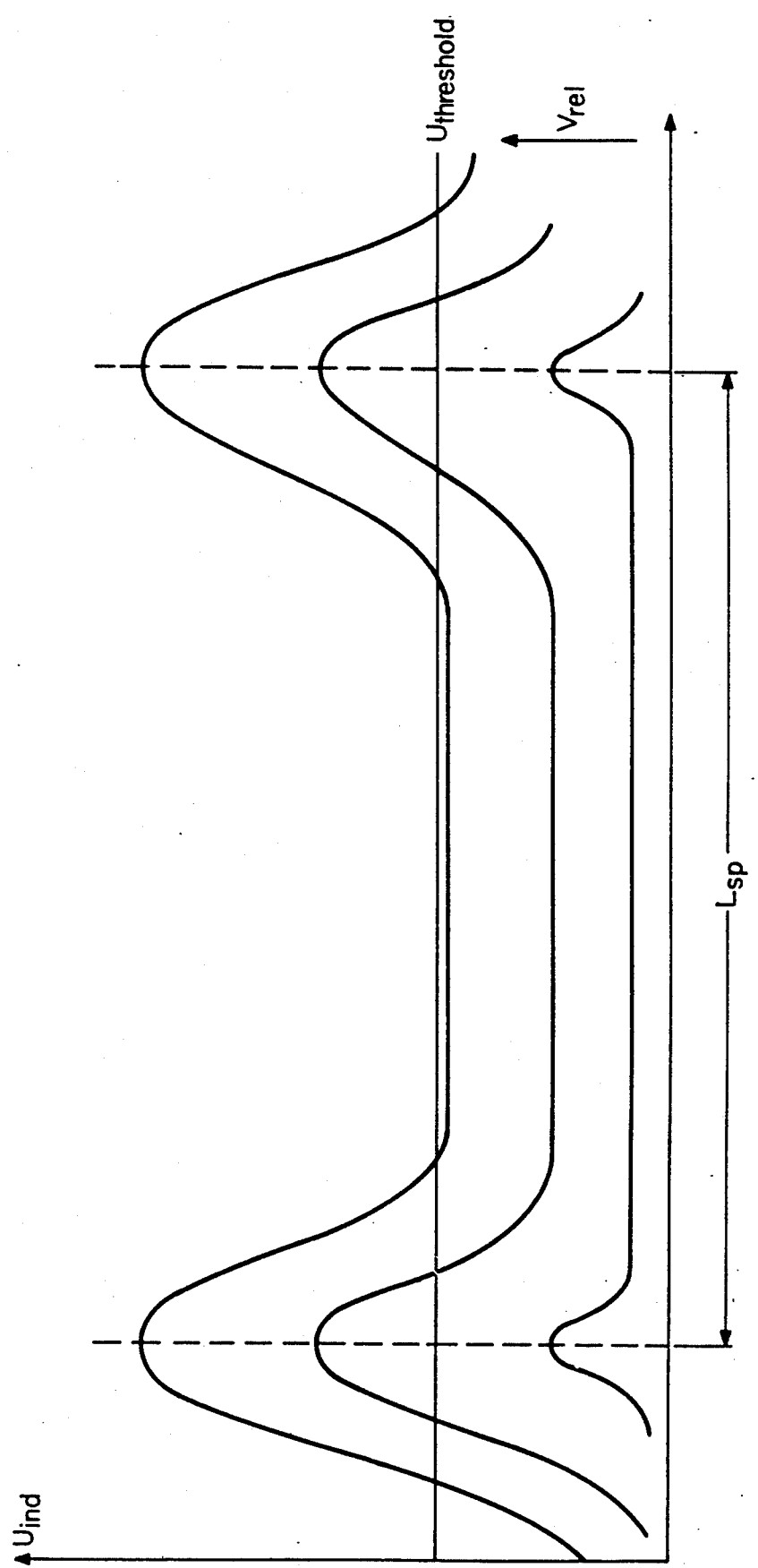
FIG. 2 illustrates the induced voltage at a constant difference in speed along the coil.

Induced voltage $U_{ind}$ is processed by comparing it with a threshold voltage $U_{Grenz}$. This voltage represents the maximal permissible relative speed $V_{rel}$. Exceeding the threshold indicates either that the maximal permissible relative speed between cylinder 1 and shock-absorbing piston 3 has been exceeded or that the piston is all the way in or all the way out. The attenuating process is shifted over to "hard characteristic," and cylinder 1 will impact a buffer 6 at a safe speed. As will be evident from FIG. 2, the piston's farthest-in and farthest-out positions are ignored when the relative speed is low because there is no risk of the dashpot overstroking.

I claim:

1. A method for measuring relative speed and regulating farthest-in and farthest-out positions of a shock-absorbing cylinder and a shock-absorbing piston movable back and forth within said cylinder and attached to a piston rod in a motor-vehicle dashpot, comprising the steps of: providing said piston with a sensor coil; providing said cylinder with a permanent magnet movable relative to said sensor coil and along said sensor coil; processing by an electric circuit a voltage induced in said sensor coil through relative motion between said sensor coil and said permanent magnet for regulating said farthest-in and farthest-out positions; moving said magnet always past one end of said coil just before said piston enters its farthest-in or farthest-out positions for increasing the voltage induced in said coil; generating a signal from the increased voltage to represent one of the dashpot's farthest-in or farthest-out positions; measuring the relative speed of said cylinder and piston from said voltage induced in said coil; and regulating said farthest-in and farthest-out positions in response to a predetermined voltage threshold.

2. A method as defined in claim 1, wherein said farthest-in and farthest-out positions are regulated in response to a voltage threshold that is higher than said induced voltage at a midsection of said coil, said voltage threshold corresponding to a maximum permissible relative speed.

3. A method as defined in claim 1, wherein said coil has a higher inductance at ends of said coil.

4. A method for measuring relative speed and regulating farthest-in and farthest-out positions of a shock-absorbing cylinder and a shock-absorbing piston movable back and forth within said cylinder and attached to a piston rod in a motor-vehicle dashpot, comprising the steps of: providing said cylinder with a sensor coil; providing said piston with a permanent magnet movable relative to said sensor coil and along said sensor coil; processing by an electric circuit a voltage induced in said sensor coil through relative motion between said sensor coil and said permanent magnet for regulating said farthest-in and farthest-out positions; moving said magnet always past one end of said coil just before said piston enters its farthest-in or farthest-out positions for increasing the voltage induced in said coil; generating a signal from the increased voltage to represent one of the dashpot's farthest-in or farthest-out positions; measuring the relative speed of said cylinder and piston from said voltage induced in said coil; and regulating said farthest-in and farthest-out positions in response to a predetermined voltage threshold.

5. A method as defined in claim 4 wherein said farthest-in and farthest-out positions are regulated in response to a voltage threshold that is higher than said induced voltage at a midsection of said coil, said voltage threshold corresponding to a maximum permissible relative speed.

6. A method as defined in claim 4 wherein said coil has a higher inductance at ends of said coil.

7. A method as defined in claim 2 wherein said coil has a higher inductance at ends of said coil.

8. A method as defined in claim 5, wherein said coil has a higher inductance at ends of said coil.

* * * * *